United States Patent Office 3,429,297
Patented Feb. 25, 1969

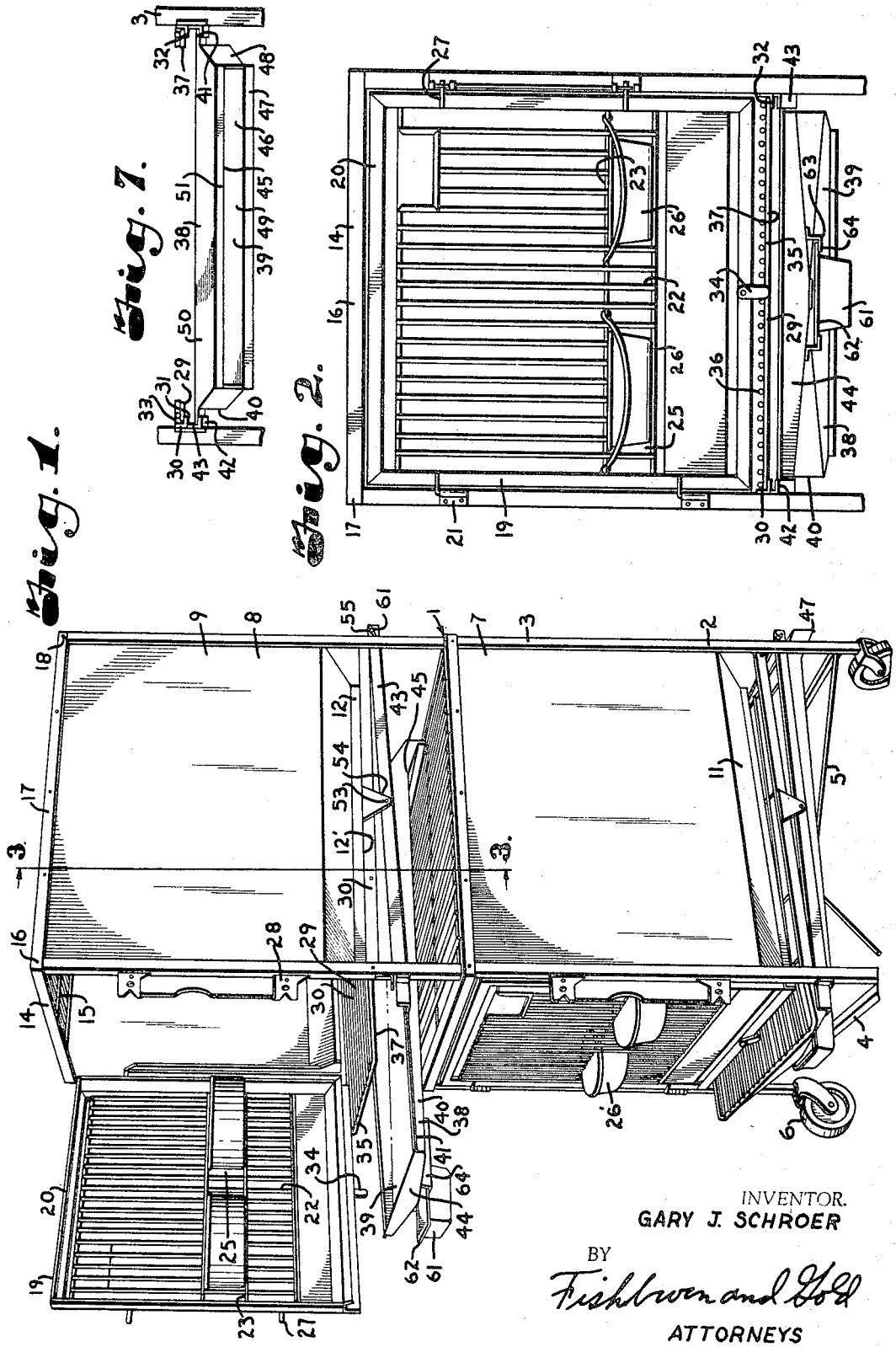

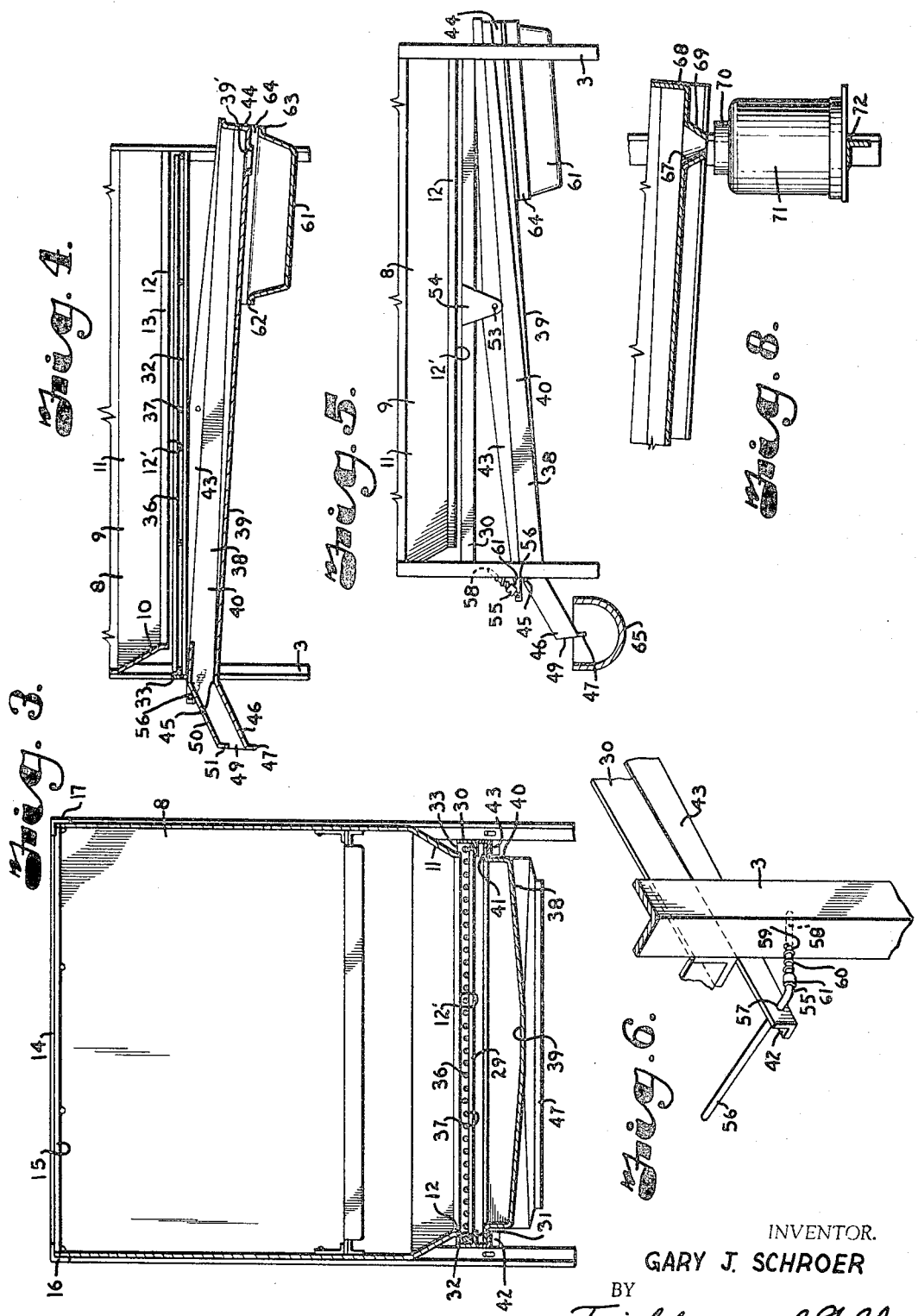

3,429,297
CAGE FOR LABORATORY ANIMALS
Gary J. Schroer, Kansas City, Mo., assignor to Schroer Manufacturing Company, Inc., Kansas City, Mo., a corporation of Missouri
Filed Jan. 19, 1967, Ser. No. 610,446
U.S. Cl. 119—17         4 Claims
Int. Cl. A01k 1/10

ABSTRACT OF THE DISCLOSURE

A cage for laboratory animals with a frame supporting top, side, front and rear walls with certain of the walls having spaced openings over substantially the whole area thereof and with at least one wall pivotally mounted to open the interior for access thereto, the lower portion of certain walls being inclined inwardly and downwardly with the bottom opening of lesser dimensions than the frame and a bottom wall slidably supported by the frame below said bottom opening, said cage having a tray removably supported under the bottom wall on pivotally mounted rails whereby the tray may be inclined selectively to the rear for flow of waste to a disposal exteriorly of the cage or to the front for flow of urine to a collection container, said rails being associated for simultaneous pivotal movement and having resilient means urging the rails to selected inclined position of the tray.

---

Laboratory animals such as dogs, rabbits and the like are usually maintained in metal cages for study and in order for certain tests to be made it is necessary to collect urine for analysis and at other times it is desirable to have waste matter disposed exteriorly of the cage, as, for example, to a waste collection trough suitably supported adjacent the rear of the cage, such troughs usually serving a row of cages to conduct the waste material to a common disposal. To serve these conditions, the animal is supported by an open type floor or bottom wall, as, for example, a frame with a plurality of wires or rods and the tray is mounted thereunder and inclined to the rear for the flow of urine and fecal matter to the collecting trough. While, heretofore, the tray could be inclined the supporting structure and arrangement of the urine collecting container were such that cages in tiers required substantial spacing and also difficulties were presented in cleaning and maintenance.

The principal objects of the present invention are to provide a cage structure with a metabolism tray mounting and structure for selective tilting either for disposal of waste or collection of urine, said tray being removable for facilitating cleaning; to provide a cage structure particularly adapted for arrangement in tiers wherein one is supported above another with reduced spacing between same; to provide a cage structure wherein the metabolism tray is removably mounted on laterally spaced rails pivotally mounted on the cage frame under the bottom wall at an intermediate axis with said rails being connected for simultaneous movement and resiliently urged to selected inclined position; to provide such a structure wherein a urine container is removably mounted on said tray at an opening therein for assuring alignment and delivery of the urine to the container when in collecting position thereby eliminating difficulties in proper positioning of the container; and to provide a metabolism cage as economical to manufacture and maintain and easily operated to assure obtaining suitable specimens and proper waste disposal.

Other objects and advantages of this invention will become apparent from the following description taken in connection with the accompanying drawings wherein are set forth by way of illustration and example certain embodiments of this invention.

FIG. 1 is a perspective view of the cage frame structure with two cages therein embodying the features of the present invention.

FIG. 2 is a front elevation of the upper cage and frame.

FIG. 3 is a vertical fragmentary sectional view through the upper cage on the line 3—3, FIG. 1.

FIG. 4 is a fragmentary vertical section through the tray container and lower portion of the frame.

FIG. 5 is a fragmentary side elevation of the cage and tray structure showing the tray inclined to disposal position.

FIG. 6 is a fragmentary detailed perspective view of the tray guide rail positioner.

FIG. 7 is a fragmentary rear elevation of the tray and supports.

FIG. 8 is a fragmentary sectional view through a modified form of tray and collector.

Referring more in detail to the drawings:

The reference numeral 1 designates a laboratory cage structure adapted for single cages or for a plurality of individual animal cages supported on a frame 2 in a tier or one above another. Also, the cages may be arranged to be stationary or mobile. In the structure illustrated, the cage structure includes a frame 2 having spaced upright columns 3 formed of suitable structural shapes such as angle members. The uprights are joined together from side to side adjacent the lower ends by angle members 4 and suitable bracing 5 and is also connected from side to side and front to rear by the cage structures as later described.

In the structure illustrated in FIG. 1, the cage structure is mobile and has suitable wheels or casters 6 mounted on the lower ends of the uprights 3. While the structure shows a lower cage 7 and upper cage 8 the structures are substantially the same. The cages individually have side and rear walls 9 and 10 respectively formed of stainless steel preferably in one piece. The marginal portions of the walls engage the inner portions of the uprights 3 and are suitably secured thereto as by welding. The side and rear walls at the lower portions thereof have inwardly and downwardly inclined portions 11 terminating in downwardly turned flanges 12. The flanges 12 and inclined portions 11 of the side walls are connected at the rear to the corresponding portions of the rear wall whereby said flanges 12 define a bottom opening 13 of lesser width and length than the frame 2. The cage also includes a top wall 14 which may be solid or open as desired. In the illustrated structure the top wall 14 has openings over substantially the whole area thereof formed by longitudinally and transversely extending spaced apart rods or wires 15, said rods being connected at their end portions to a top frame 16 formed of suitably structural member such as angles that are mounted on the uprights with outer flange 17 outwardly of and engaged with said uprights 3. The top frame portions have the flanges 17 thereof suitably secured to the upper portions of the side and rear walls 9 and 10 by fastening devices 18, such as rivets or the like.

The forward or front part of the cage is normally closed by a front wall or door 19 which consists of a rectangular frame 20 hinged to an upright of the frame by hinge members 21. It is preferred that said door or front wall have spaced openings over a substantial portion of the area thereof, and in the illustrated structure has a plurality of vertical rods 22 secured to the rectangular frame. Also, transverse vertically spaced bars 23 are arranged to cooperate with the door structure to form openings 25 with supporting members 26 to receive water bowls 26 and the like. The door has spaced bars or lugs 27 that cooperate with latch members 28 mounted on the upright at the other side of the door opening from the hinges 21 to hold the door in cage closing position. The cage structure as shown and described may have variations for adapting same to particular handling and study of animals, for example, the side walls may have spaced openings or be made of rods as desired, with the structure all being such as to confine the animal for handling and study.

Each of the cages has a removable bottom wall or floor 29 below but adjacent to the lower edges 12' of the wall flanges 12, the bottom 29 being larger than the bottom opening 13 of the cage, whereby the outer margins extend outwardly relative to the flanges 12. In the structure illustrated, bottom supports or ways 30 are secured to the uprights 3 and extend from front to rear. The ways 30 are shown as angle members and have inwardly extending flanges 31 or are otherwise constructed to provide ledges 32 on which side margins of the bottom wall 29 are slidably mounted. There is a stop structure 33 at the rear of the ways to limit rearward movement of the bottom 29, and also the bottom is retained in position by suitable means, which, in the illustrated instance, is a downwardly extending lug or bar 34 on the front wall or door 7 which engages the forward edge 35 of the bottom wall 29 when the door is in closed position. When the door is in open position, the bottom wall 29 may be slid forwardly for removal, illustrated in the upper cage of FIG. 1. The bottom wall or floor 29 in the illustrated structure is formed of a plurality of closely spaced rods or wires 36 secured to a wire frame 37 whereby the open structure permits urine and fecal matter to pass therethrough and out of the living area of the animal, and when cages are in tiers there is spacing between the cages, in other words, between the floor of one and the top of the other, to accommodate a collecting or disposal apparatus.

A pan or tray 38 is supported under the bottom wall or floor 29 of each cage. The pan 38 has a bottom wall 39 with upwardly extending sides or wall 40, said side walls having suitable means 41 for engaging a supporting structure for the pan. In the structure illustrated, the side walls 40 of the pan have laterally outwardly extending members or flanges 41 adapted to rest on ledges 42 of guide rails 43 suitably supported by the frame, as later described. The pan 38 has a front wall 44 that extends upwardly from the bottom 39 to a height substantially corresponding to the side walls 40. The pan or tray 38 extends completely under the cage and at approximately the rear of the cage the bottom wall 39 turns downwardly and rearwardly as at 45 to provide a downwardly and rearwardly inclined portion 46 terminating in a downwardly extending lip 47. At the transverse line approximately of the bend 45 the bottom is transversely straight or level and forwardly therefrom the bottom is a slightly V-shaped with the greatest depth of the V adjacent the forward wall 44, whereby the pan has a trough-like bottom and material in the pan will move toward the center portion. At the rear of the cages, the side walls of the pan are inclined rearwardly and inwardly to form a converging side portions 48 of reduced width to a discharge opening 49 at the rear of the pan. A top wall 50 extends across the pan at the rear portion and is secured to the side walls thereof, said top wall 50 having a depending lip 51 as illustrated in FIG. 4 to confine waste material passing therethrough.

The guide rails 43 in the illustrated structure are generally angle shaped and slightly longer than the length of the cages from front to rear whereby said guide rails project beyond the uprights at the front and rear of the cage frame and each of the rails are pivotally mounted substantially intermediate their length by means of pivot pins 53 on brackets 54 that are secured to and depend from the bottom support members 31. In this manner, as the guide rails are rocked about their pivot pins 53, the pan 38 supported thereby will also rock so the pan may be inclined either forwardly or rearwardly as illustrated in FIGS. 4 and 5, respectively. To insure simultaneous movement of the laterally spaced guide rails 43 and also the retention in a selected position, a control member 55 in the form of a toggle structure is utilized. The control structure consists of a rod 56 extending transversely at the rear of the guide rails and through apertures 57 in upstanding flanges thereof. The rods have forwardly turned end portions 58 that are parallel to each other and extend through apertures 59 in the rear upright 3. The end portions 58 are such length that they always extend through the apertures 59 in any operative position of the guide rails. Coil springs 60 are sleeved on the end portions 58 with one end engaging the adjacent upright 3 and the other end a collar 61, whereby the spring is compressed and always urges the collar rearwardly relative to the upright.

The forward portion of the pan bottom 39 has an opening 39' at the center portion for discharge of urine into a collecting pan or container 61. The collecting pan is a hollow receptacle having outwardly extending lips 62 adapted to slidably engage inwardly extending ledges 63 of laterally spaced tracks or brackets 64 that depend from the bottom wall 39 whereby said container 61 is supported on the pan 38 and moves therewith and is in a position to receive the discharge from the opening 39' in the bottom of the pan.

In normal position, with an animal in the cage, the forward end of a guide rail 43 is grasped and through the connection of the rod 56 with the rear portions of the guide rails the guide rails move simultaneously, whereby the guide rails pivot on the pivot pin 53 and move the pan to an inclined position, as illustrated in FIG. 5. In this position there is a slope of the entire bottom of the pan 38 to the rear and the cage is positioned near a trough 65 leading to a suitable discharge for waste from the animal. Also, the pan may be flushed by a hose or the like for cleaning. The pan is slidable in the guide rails and, therefore, the entire pan structure may be removed as desired for cleaning and the container 61 is removable from the pan so it can also be cleaned and restored to the operative positions after such cleaning. When it is desired to have a urine specimen, a guide rail is grasped at the forward end and swung downwardly, whereby both guide rails and the pan 38 mounted thereon swing to the position illustrated in FIG. 4, and with the container 61 mounted on the pan as illustrated, urine specimens will drain into the container 61.

In either of the inclined positions of the pan, the toggle mechanism 55 is such that the rod moves past a line or plane from the pivot pins 57 through the apertures 59 so that the spring urges the guide rails into further swinging movement with the guide rails engaging the bottom of the angle members 30 as a limit in the forward inclination of the pan. In the position illustrated in FIG. 4, engagement of the guide rail and angle members 30 is illustrated in FIG. 6. The stops for limiting the inclination in the position illustrated in FIG. 5 is the engagement of the forward portion of the guide rail with the bottom of the angles 30.

In the form of the invention illustrated in FIG. 8, the pan and support structure are substantially the same as described relative to the form of the invention illustrated in FIGS. 1 to 7, inclusive, however, the discharge opening 67 adjacent the forward end 68 of the pan is defined by downwardly extending inwardly sloping portions 69 providing a funnel shape adapted to align with an opening 70 of a container 71 suitably supported therebelow on a bracket 72 mounted at the forward end of the frame structure.

It is to be understood that while I have illustrated and described certain forms of my invention, it is not to be limited to the specific forms or arrangements or parts herein described and shown.

I claim:
1. A cage for laboratory animals comprising:
  (a) a frame having upright corner posts connected by spaced substantially horizontal members,

(b) top, side, front, rear and bottom walls supported by said frame and defining an enclosure for animals, (c) a tray extending under said bottom wall and projecting outwardly beyond said rear wall, (d) guide rails having support ledges slidably mounting said tray, said guide rails being pivotally mounted on said frame at an intermediate transverse axis for up and down swinging movement for tilting the tray to selectively incline forwardly and rearwardly, (e) means connecting the guide rails for simultaneous swinging movement thereof, (f) toggle connection between the guide rails and frame and resilient means urging and retaining the guide rails in selected forward and rearward inclined position until forcibly moved.

2. A cage for laboratory animals as set forth in claim 1 wherein the toggle connection between the guide rails and frame is a rod extending transversely of the cage and connected to rear portions of said guide rails with arms extending therefrom and having slidably pivoted connection with the frame positioned relative to the pivot of the guide rails whereby said arms pass by center as the tray is moved from one inclined position to another and the resilient means is a spring sleeved on the arms and engaging the frame.

3. A cage for laboratory animals as set forth in claim 1 including:

(a) a urine drain in said tray adjacent the front thereof, (b) a collecting vessel having an open top, (c) means on the tray supporting said collecting vessel in depending relation thereon with the open top thereof aligned with the urine drain for discharge from the tray to the vessel when the tray is inclined downwardly and forwardly.

4. A cage for laboratory animals as set forth in claim 3 wherein the collecting vessel has a flange adjacent said open top extending outwardly from the vessel in opposed relation, and the supporting means on the tray are members in laterally spaced relation to the drain with portions extending inwardly toward the drain and forming upwardly facing ledges for slidably mounting the vessel flanges to removably support said vessel under the drain.

References Cited

UNITED STATES PATENTS

| 2,655,129 | 10/1953 | Miller | 119—17 |
| 2,697,413 | 12/1954 | Tharby | 119—17 |
| 3,098,465 | 7/1963 | Irey | 119—15 |
| 3,160,140 | 12/1964 | Porter | 119—18 |
| 3,228,375 | 1/1966 | Philippe | 119—17 |

FOREIGN PATENTS 406,851   3/1934   Great Britain.

HUGH R. CHAMBLEE, *Primary Examiner.*

U.S. Cl. X.R.

119—18